United States Patent [19]

Yigdall

[11] Patent Number: 4,676,818
[45] Date of Patent: * Jun. 30, 1987

[54] EDGE GRIPPING MEANS FOR ATTENUATING FLOAT GLASS

[75] Inventor: Jeffrey S. Yigdall, Decatur, Ill.

[73] Assignee: PPG Industries, Inc., Pittsburgh, Pa.

[*] Notice: The portion of the term of this patent subsequent to Feb. 25, 2003 has been disclaimed.

[21] Appl. No.: 812,880

[22] Filed: Dec. 23, 1985

[51] Int. Cl.$^4$ .............................................. C03B 18/02
[52] U.S. Cl. ..................................... 65/99.5; 65/182.4
[58] Field of Search ............................... 65/99.5, 182.4

[56] References Cited

U.S. PATENT DOCUMENTS

| | | | |
|---|---|---|---|
| 3,326,651 | 6/1967 | Javaux | 65/65 |
| 3,373,008 | 3/1968 | Lawrenson | 65/182 |
| 3,632,323 | 1/1972 | Robinson | 65/30 |
| 3,860,406 | 1/1975 | Basler et al. | 65/99.5 |
| 3,929,444 | 12/1975 | May et al. | 65/182 |
| 4,300,938 | 11/1981 | May | 65/182.4 |
| 4,305,745 | 12/1981 | Mouly | 65/99 A |
| 4,572,731 | 2/1986 | Williams, Jr. | 65/99.5 |

FOREIGN PATENT DOCUMENTS 2057421 4/1981 United Kingdom ................. 65/99.5

Primary Examiner—Arthur Kellogg
Attorney, Agent, or Firm—Dennis G. Millman

[57] ABSTRACT

In a float glass process, traction of an attenuating device on the glass ribbon is enhanced by a freely rotating member forced against the underside of the ribbon. The member is preferably a carbon cylinder, and the force is regulated from outside the forming chamber.

10 Claims, 3 Drawing Figures

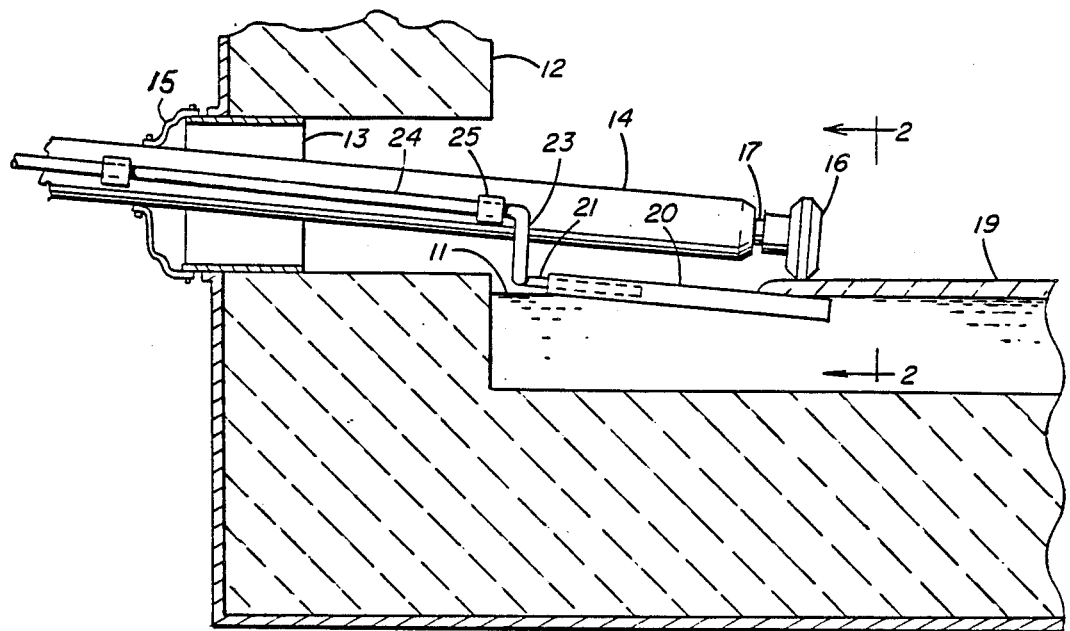
FIG. 1
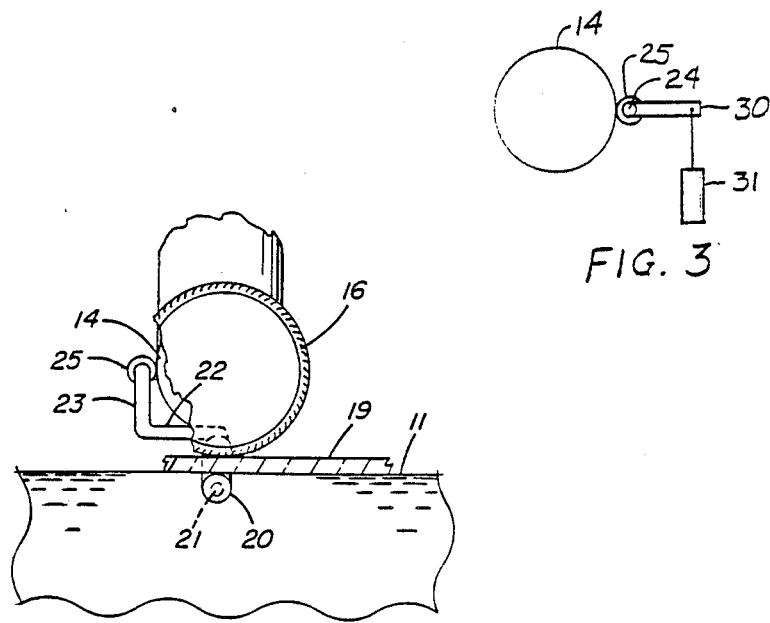
FIG. 3
FIG. 2

EDGE GRIPPING MEANS FOR ATTENUATING FLOAT GLASS

BACKGROUND OF THE INVENTION

This invention relates to the float process for making flat glass whereby a stream of molten glass is fed onto a pool of molten metal (usually tin). While the glass is floating on the molten metal in a softened condition, forces are applied to stretch the ribbon of glass to the desired thickness. Part of these forces are conventionally applied by means of rolls that extend through the sidewalls of the float forming chamber and engage marginal edge portions of the glass ribbon. These side engaging means serve to prevent the ribbon from unduly losing width as it is being longitudinally stretched, or in some cases they may be used to laterally stretch the ribbon. In the most common practice, the attenuating rolls engage only the top surface of the ribbon. Traction between the attenuating roll and the glass ribbon is limited by the buoyant force of the molten metal on the glass ribbon. Traction can be enhanced by providing knurled or toothed glass engaging surfaces on the periphery of the attenuating rolls, but in some cases the traction attainable is not as great as would be desired, particularly when attempting to attenuate the ribbon after it has cooled substantially (e.g. below about 1500° F., 820° C.).

In the past it was also known to grip marginal edge portions of a glass ribbon in a float bath between upper and lower driven rolls, the lower roll being submerged in the molten metal. Such an arrangement would be capable of considerable traction, but that type of attenuating device has been found to be difficult to manipulate and also presents a difficulty in maintaining a fixed gap between the top and bottom rolls because of the potential for eccentricity of the roll shafts in the hot environment of the float forming chamber. Cooling the roll that is immersed in the molten metal has the drawback of a strong cooling effect on the adjacent molten metal. An attempt to overcome this problem is shown in U.S. Pat. No. 3,373,008 (Lawrenson et al.) in which the lower roll is isolated from the molten metal by a protective slipper. Such an arrangement, however, is even more cumbersome and disadvantageously entails contact between the glass ribbon and the slipper member, whereby the marginal edge portion of the glass is significantly displaced. Deformation of the glass ribbon would be particularly undesirable when attenuating the ribbon after its viscosity has increased substantially in the cooler regions of the float forming chamber.

An attenuating device similar to the present invention is disclosed in U.S. patent application Ser. No. 685,427, filed on Dec. 24, 1984 by O. F. Williams, Jr., now U.S. Pat. No. 4,572,731 which is assigned to the assignee of the present invention.

SUMMARY OF THE INVENTION

In the present invention the grip of an attenuating device contacting the top surface of a glass ribbon in a float forming chamber is enhanced by means of a solid member on the underside of the glass ribbon in approximate vertical alignment with the top roll, wherein the bottom member is adjustably urged against the underside of the ribbon. The upward force of the bottom member permits greater downward force to be exerted by the attenuating device engaging the top surface of the glass ribbon. The resulting improvement in the tractive force that may be applied to the glass ribbon is useful at any of the locations where attenuating forces are applied to the glass ribbon in the float forming chamber, but it is particularly useful in regions where the glass has cooled and stiffened to the point where attenuation has heretofore been considered difficult due to insufficient traction of attenuating devices on the glass ribbon. For a conventional soda-lime-silica flat glass composition, attenuation has been considered difficult when the glass temperature falls below 1500° F. (820° C.), but the present invention enables attenuation to be affectively carried out below that temperature. The traction developed by the attenuating devices of the present invention is sufficient to enable the ribbon to be widened in the relatively cool regions of the float forming chamber. This ability is particularly significant in the practice of the method disclosed in U.S. Pat. No. 4,305,745 (Mouly) wherein improved optical quality of glass is obtained by widening the ribbon subsequent to the major attenuation steps.

The member that is submerged in the molten metal and contacts the underside of the glass ribbon is not driven, but is preferably mounted so as to be free to rotate so as to avoid frictional drag against the glass ribbon. In order to avoid the need for cooling, the submerged member may be fabricated of a material capable of sustained contact with the molten metal. The preferred material is carbon, which is durable in the non-oxidizing environment conventionally maintained in the forming chamber. The submerged member is carried at the end of a pivotable member actuated from outside the forming chamber so as to regulate the amount of force applied to the underside of the glass ribbon. By this arrangement the gripping force applied to the ribbon can be varied over a wide range and is limited only by the hardness of the glass. The preferred embodiment of the submerged member is a carbon cylinder bored axially at one end to be received on the end of a rod extending to the exterior of the forming chamber. The cylinder may be angled downwardly toward the center of the glass so that the bored end may be maintained above the molten metal.

Further understanding of the invention will be obtained from the drawings and the detailed description of preferred embodiments which follow.

THE DRAWINGS

FIG. 1 is a vertical cross-section taken transversely across a side portion of a float glass forming chamber showing a conventional attenuating device carrying a preferred embodiment of a bottom surface engaging member in accordance with the present invention.

FIG. 2 is a vertical cross-section of the attenuating device taken along line 2—2 in FIG. 1.

FIG. 3 is a schematic end view of the exterior end of the attenuating device showing torque means.

DETAILED DESCRIPTION

For the purpose of illustrating the invention, the preferred mode, as depicted in FIGS. 1 and 2, will be described in detail herein, but it should be understood that other embodiments are contemplated within the scope of the principles of the invention. Referring now to FIG. 1, there is shown a side portion of a float glass forming chamber having a basin 10 containing a pool of molten metal 11 usually consisting essentially of molten tin. Sidewall member 12 is suspended above the side of the basin, and the space therebetween is filled with removable side seal members 13. At locations where attenuating devices are extended into the floating chamber, the side seal member 13 is adapted to accommodate an elongated support beam 14 that may be water cooled. The opening for the beam 14 is closed, and flexibility for adjusting the position of the beam is provided by a flexible boot member 15. The interior of the chamber is fully enclosed so as to maintain a non-oxidizing atmosphere consisting of nitrogen and sometimes a small amount of hydrogen to prevent oxidation of the molten tin.

At the end of the beam 14 there is carried the attenuating device for engaging the top surface of the glass ribbon 19, which in the embodiment shown is a roll 16 which may be provided with a plurality of rows of teeth about its periphery. Other configurations of attenuating rolls as are known in the art may be employed. Other known devices such as blades or gas jets may also be employed. The roll 16 is mounted on a rotating shaft 17 which extends along the length of the beam 14 to external drive means (not shown). Means to provide rotation to the shaft 17 and arrangements for adjustably supporting the beam 14 are known in the art, suitable examples of which may be seen in U.S. Pat. Nos. 3,929,444 (May et al.) and 4,300,938 (May), the disclosures of which are hereby incorporated by reference.

Bearing against the underside of the glass ribbon 19 is a submerged member in the form of a cylinder 20 which may be fabricated of carbon or other material compatible with the molten metal. The cylinder 20 is provided with an internal bore at one end within which is received end section 21 of a support rod extending substantially parallel to the beam 14. The cylinder 20 is free to rotate on the rod section 21 so as to reduce drag on the glass ribbon when the cylinder contacts the underside of the glass ribbon in a region below the attenuating roll 16. The end rod section 21 is carried at the end of a transverse link 22 (FIG. 2) extending from a vertical link 23, which, in turn, extends from elongated rod 24, whereby rotation of the rod 24 from outside the forming causes the cylinder 20 to be pivoted upwardly toward the underside of the glass ribbon. The rod 24 is rotatably received in a sleeve 25 affixed to the beam 14 generally parallel to the beam. To prevent molten metal from deteriorating the end portion 21 of the rod, the cylinder may be inclined slightly from horizontal so that the bore is above the surface level of the molten metal in the float forming chamber. This inclined orientation may be provided by inclining the entire attenuating apparatus including beam 14, as is typically the case in operating conventional attenuating rolls.

Means for providing torque to the rod 24 to force the cylinder 20 against the underside of the ribbon may include a lever 30 as shown in FIG. 3 outside the forming chamber extending radially from the rod, with a spring or weights 31 acting on the lever.

When forming conventional soda-lime-silica flat glass by a float process, the molten glass is typically delivered onto the molten metal pool at a temperature of about 1900° F. (1040° C.) and as the ribbon progresses along the length of the float forming chamber, it cools until it attains a temperature at which it can be taken from the molten metal pool and supported by solid conveying means, usually at a temperature of about 1100° F. (600° C.). The viscosity of the glass ribbon is usually considered suitable for attenuation to thicknesses below the equilibrium thickness of the molten glass on the molten metal when the glass is in the temperature range of about 1500° F. (820° C.) to about 1800° F. (980° C.). However, it has been found that the attenuating means of the present invention provides sufficient traction to enable significant attenuation below 1500° F. (820° C.). The ability to maintain or increase the glass ribbon width in the region where its temperature is below 1500° F. (820° C.) is believed to have a positive affect on the applicable quality of the glass by improving the surface flatness thereof. The present invention has been found to permit lateral stretching of the glass in preferred cases below 1400° F. (760° C.) and sometimes even below 1300° F. (705° C.).

Other variations and modifications as are known to those of skill in the art may be resorted to without departing from the spirit and scope of the invention as defined by the claims which follow.

I claim:

1. Apparatus for forming flat glass comprising a chamber adapted to hold a pool of molten metal, means for delivering a stream of molten glass into the chamber so as to form a ribbon on the pool of molten metal, attenuating means for gripping marginal edge portions of the glass ribbon including an upper member tractably engaging the upper surface of the glass ribbon, a lower member extending under the marginal edge portion of the glass ribbon in substantial vertical alignment with the region of engagement of the upper member, support means having an offset end portion rotatably carrying the lower member and mounted so as to pivot the lower member into contact with the underside of the glass ribbon, and means for applying torque to the support means so as to pivot the offset end portion and to force the lower member upwardly against the underside of the glass ribbon.

2. The apparatus of claim 1 wherein the lower member is comprised of carbon.

3. The apparatus of claim 2 wherein the member is a cylinder mounted with its axis slightly inclined from horizontal.

4. The apparatus of claim 1 wherein the upper member is a rotatably driven roll.

5. The apparatus of claim 1 wherein the lower member is pivotably carried on support means for the upper member.

6. The apparatus of claim 3 wherein the cylinder is provided with an axial bore at one end within which a mounting rod is received, the bore being supported above the elevation of the molten metal, the opposite end of the cylinder being sumberged in the molten metal under the glass ribbon.

7. A method of forming flat glass comprising delivering a stream of molten glass onto a pool of molten metal so as to form a ribbon of glass that is passed longitudinally along the pool of molten metal, engaging the top surface of the glass ribbon in a marginal edge portion with an attenuating device that imparts a transverse component of force to the glass ribbon, providing an upward force to the region of the ribbon engaged by the attenuating device by means of a freely rotatable member controllably urged against the underside of the glass ribbon, and controlling the upward force by externally applying a torque to pivot the freely rotatable member against the underside of the ribbon.

8. The method of claim 7 wherein the member contacting the underside of the glass ribbon is caused to rotate by frictional contact with the glass ribbon.

9. The method of claim 7 wherein the attenuating device acts on the glass ribbon by means of a rotating roll contacting the top glass surface.

10. The method of claim 8 wherein the member is substantially shaped as a cylinder and rotates about an axis slightly inclined from horizontal.

* * * * *